United States Patent [19]

Otto

[11] Patent Number: 5,719,584
[45] Date of Patent: Feb. 17, 1998

[54] SYSTEM AND METHOD FOR DETERMINING THE GEOLOCATION OF A TRANSMITTER

[75] Inventor: James C. Otto, Indian Harbor Beach, Fla.

[73] Assignee: Harris Corporation, Melbourne, Fla.

[21] Appl. No.: 706,909

[22] Filed: Sep. 3, 1996

[51] Int. Cl.$^6$ ........................................ G01S 3/02
[52] U.S. Cl. .................... 342/465; 342/387; 342/457
[58] Field of Search .............................. 342/387, 465, 342/457, 389

[56] References Cited

U.S. PATENT DOCUMENTS

| | | | |
|---|---|---|---|
| 3,789,413 | 1/1974 | Ross et al. | 343/113 R |
| 4,888,593 | 12/1989 | Friedman et al. | 342/387 |
| 5,317,323 | 5/1994 | Kennedy et al. | 342/457 |
| 5,493,308 | 2/1996 | Bingham et al. | 342/442 |
| 5,526,001 | 6/1996 | Rose et al. | 342/442 |
| 5,596,313 | 1/1997 | Berglund et al. | 340/574 |

*Primary Examiner*—Thomas H. Tarcza
*Assistant Examiner*—Dao L. Phan
*Attorney, Agent, or Firm*—Rogers & Killeen

[57] ABSTRACT

A system and method for determining the geolocation of a transmitter within or without a set of receiving stations. The system includes plural receiving stations which determine the time of arrival and the angle of arrival of a signal from a target unit. The signal determinations are communicated to a central processing unit which determines the geolocation of a radiating unit which would provide such times of arrival and angles of arrival. By use of both time of arrival and angle of arrival information at the central processing unit, the need for receiving stations to cover a desired geographic area is reduced.

14 Claims, 4 Drawing Sheets

SYSTEM AND METHOD FOR DETERMINING THE GEOLOCATION OF A TRANSMITTER

BACKGROUND OF THE INVENTION

The present invention is related generally to systems and methods for determining the geolocation of radiating apparatus and, in particular, to a system and method for determining the geolocation of one or more radio frequency ("RF") transmitters by combining measurement estimates from two or more types of detecting systems.

The prior art contains numerous types of systems for locating the geolocation of an RF transmitter. In such systems, plural receivers are generally placed at known geolocations and each receiver monitors known frequency bands for signals emanating from an RF source at an unknown location. Upon detection of RF signals having a desired characteristic, the plural stations provide information concerning the detected signal to a central processing unit. The central processing unit (which may be located at one of the receiving stations) typically uses the multiple detected signals from the plural receiving stations to determine the geolocation of the transmitter of the signal. Currently, while other types of geolocating systems are known, most systems determine the geolocation of the transmitter based on the difference in the times of arrival of the same signal at the plural receivers (so called, time-difference-of-arrival, "TDOA", systems) or based on the angle of arrival of the same signal at the plural signals ("AOA" systems).

As explained below with reference to FIGS. 1 to 3, prior art TDOA and AOA geolocation determining systems usually need a minimum of three, geographically diverse, receiving stations to monitor a signal from a transmitter to be located. While three receiving stations may not seem a significantly large number of stations for geolocating purposes, present and expected future transmitting systems, such as analog and digital cellular telephone systems, personal communications systems, and the like, are expected to use transmitters of very low power. In such a system, in order to ensure that an accurate geolocation can be established anywhere within a predetermined geographic area, it is necessary to locate receiving stations throughout the predetermined area. Accordingly, it would be of considerable advantage, if geolocation tasks could be accurately accomplished by fewer than three receiving stations. Such systems could be designed so that any transmitter to be monitored need only to be able to communicate with two receiving stations, at a considerable cost savings for the fixed architecture of the communication system. Additionally, such an advantageous system would have a further advantage in potentially reducing the communication overhead needed to transmit data concerning received signals from the receiving stations to the central processing unit.

It is therefor an object of the present invention to provide a novel geolocating system and method which reduces these and other disadvantages experienced in prior art systems.

It is a further object of the present invention to provide a novel geolocating system and method which requires fewer receiving stations to determine the geolocation of an RF transmitter within a prescribed geographic area.

It is another object of the present invention to provide a novel geolocation system and method which reduces the computational overhead at a central processing system as compared to conventional prior art systems.

It is still another object of the present invention to provide a novel geolocating system and method which accurately determines the geolocation of a RF transmitter within a prescribed geographic area regardless of the location of the transmitter with respect to the receiving stations.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
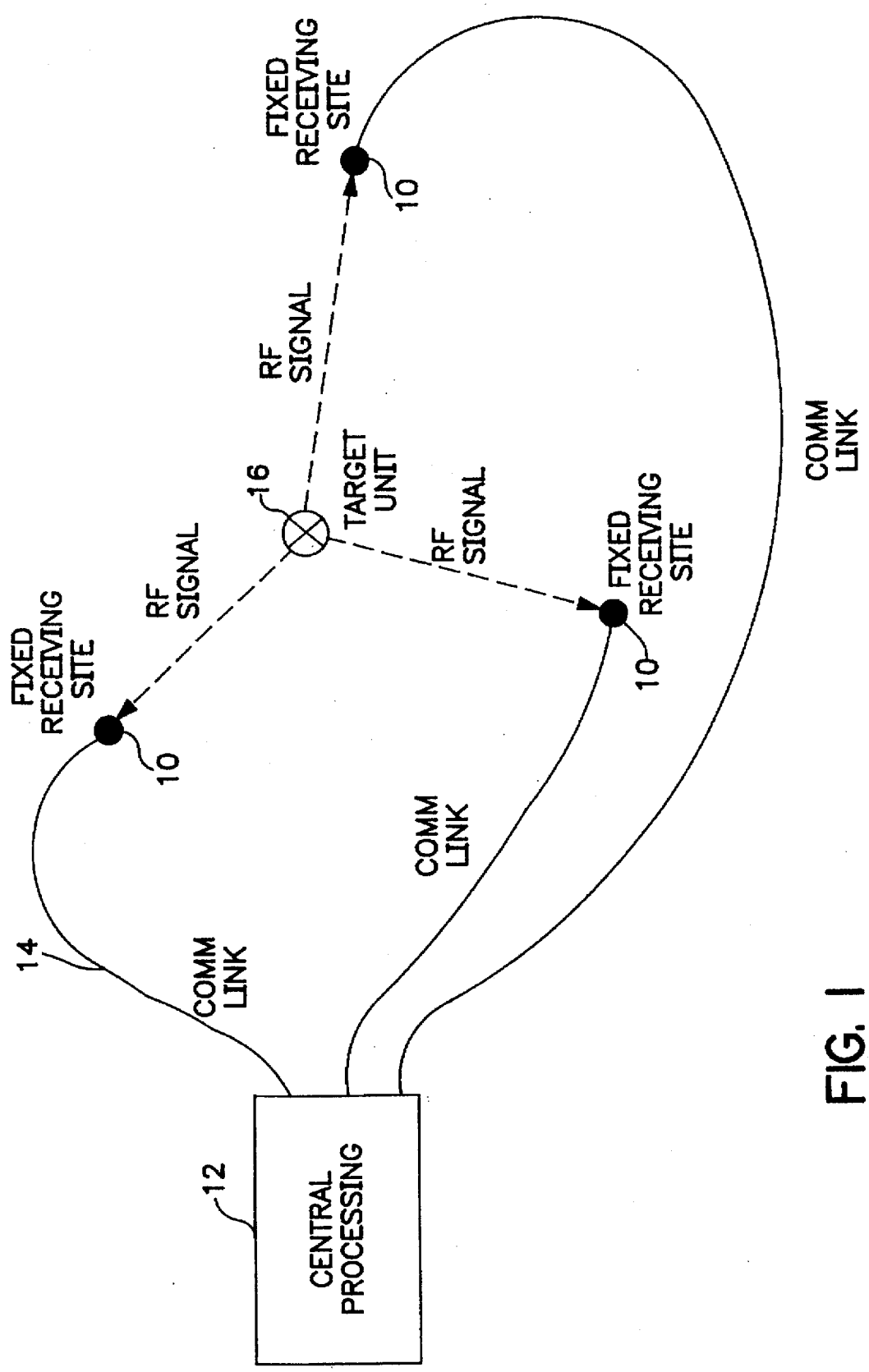
FIG. 1 is a pictorial diagram depicting a simplified system in which the present invention may be exploited.

With reference to FIG. 1, an embodiment of the present invention may be implemented in a geolocation system which utilizes plural fixed receiving sites 10, each connected to a central processing unit 12 through convention communication links 14. A target unit (or unit to be geolocated) 16 transmits a signal, which may be an RF signal or an electromagnetic signal or various types, to plural of the receiving stations.

In operation, the receiving sites (or "receiving stations") 10 each receive the signal from the target unit 16 and send a communication concerning that signal reception to the central processing unit 12. Depending upon the structure of the system, the central processing unit 12 may use the angle of arrivals of the signal at the receiving sites 10 or the times of arrival of the signal at the receiving sites 10 or other conventional means to determine the geolocation of the target unit 16. With a proper system design, the central processing system 12 can simultaneously determine the geolocation of several target units 10 located within the receiving range of plural of the receiving stations 10.

Figure 2:
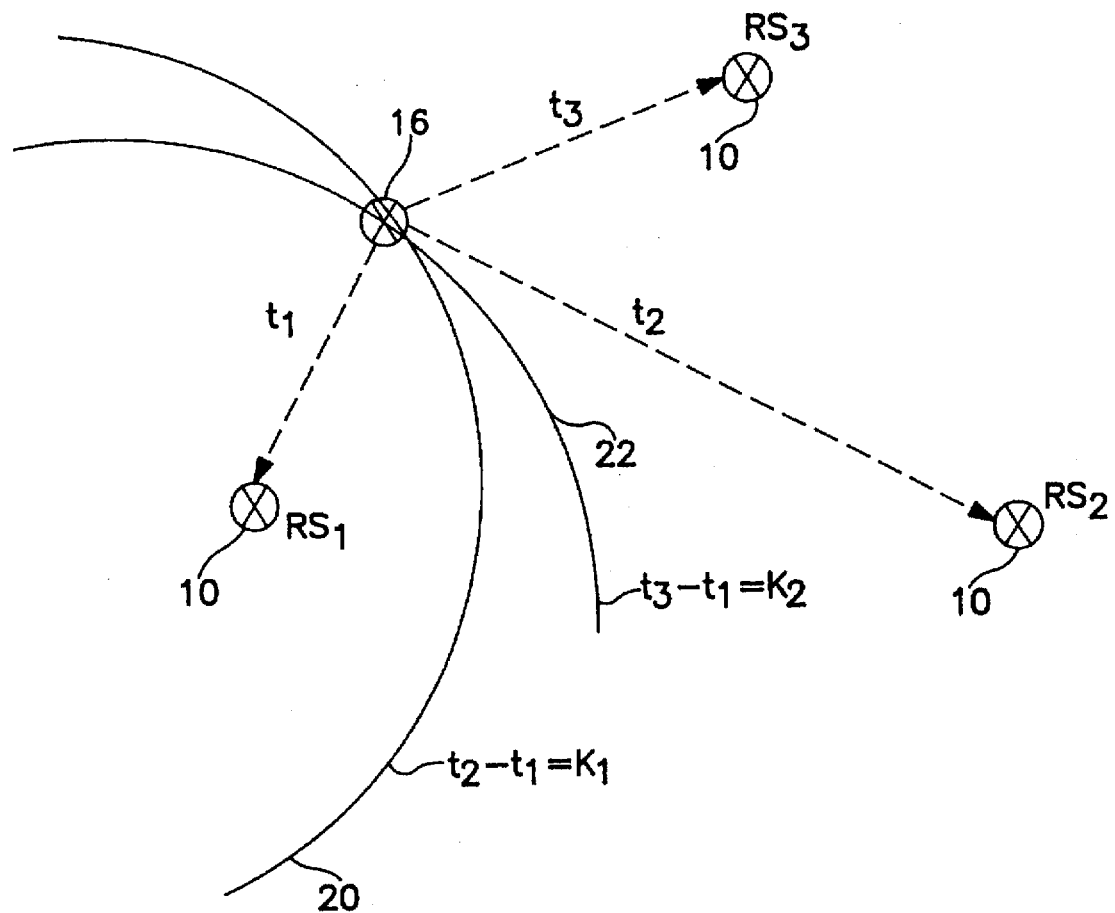
FIG. 2 is a pictorial diagram illustrating the operation of a time-difference-of-arrival system of the prior art.

With reference now to FIG. 2, one method by which the central processing unit may determine the geolocation of the target unit is known as time-difference-of-arrival ("TDOA"). In a TDOA system, a target unit transmits a signal which may be received at plural receiving stations 10, in the example system of FIG. 2, RS1, RS2 and RS3. The receiving stations RS1, RS2 and RS3 have a common time framework, such as a signal received from a high precision clock on a geosynchronous satellite, a signal received from the central processing unit 12 (not shown), or from a highly stable local clock (which may be periodically update or brought into synchronization by external signals). When an identifiable portion of the signal from the target unit 10 is received, the time at which the identifiable portion is received is ascertained by the receiving stations RS1, RS2 and RS3 using conventional techniques. Information regarding the received signal, including its time of arrival, is sent from the receiving stations RS1, RS2 and RS3 to the central processing unit. At the central processing unit, the time of arrival of the signal at the various reporting receiving stations RS1, RS2, and RS3 is compared to one another and used to compute the time difference of arrival of the signals.

By knowing the geolocation of the receiving stations RS1, RS2 and RS3 and the propagation speed of the signals sent from the target unit 16, the central processing unit 12 may determine the geolocation of the target unit within the degree of certainty available from the individual time of arrival signals.

Generally, the time difference of arrival of the same signal between any two receiving stations yields a locus of points along a parabola which intersects at a right angle a line directly connecting the two points. For example, with continued reference to FIG. 2, the possible locations of a target unit sending a signal which arrived at receiving station RS1 at $t_1$ and arrived at receiving station RS2 at $t_2$ is in the shape of a curve 20. With only two receiving stations using a TDOA method of determining, it is generally not possible to determine a precise location for a target unit but only a locus of points along a curve. Therefor, TDOA systems generally use at least three receiving stations to make a geolocation determination. For example, if the same signal as sent in the previous paragraph is also received and time tagged by a third receiving station RS3, the central processing unit 12 may compute two additional curves on which the target unit must lie (within the accuracy of the time determination), one relying upon the time difference of arrival between receiving stations RS1 and RS3 and the other relying upon the time difference of arrival between receiving stations RS2 and RS3. In the prior art system of FIG. 2, a second curve 22 (relying on the times of arrival at receiving stations RS1 and RS3) is shown. The intersection of the curves of the TDOA determinations may be taken as the geolocation of the target unit 16.

As understood by those skilled in the art, the TDOA calculations may be adjusted for factors other than propagation speed of the signals, such as local terrain effects, clock biases, etc.

Figure 3:
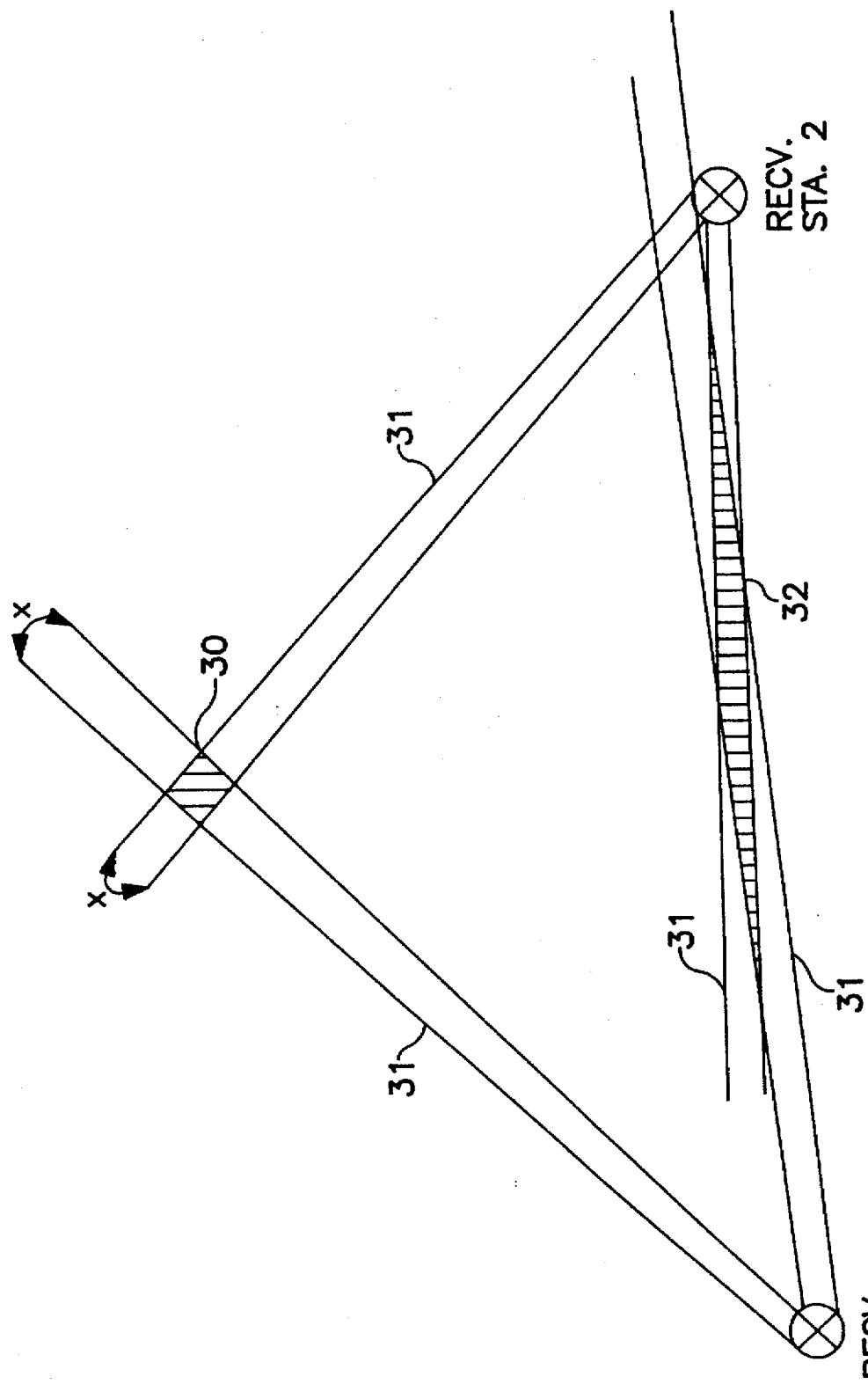
FIG. 3 is a pictorial diagram illustrating the operation of an angle-of-arrival system of the prior art.

With reference now to FIG. 3, some systems of the prior art used information regarding the angle of arrival of the signal from the target unit 16 to determine the target unit's geolocation. There are a myriad of methods for determining the angle of arrival of a signal at a receiving site, such as by: the use of a rotating antenna which is rotated to obtain the strongest signal from the target unit; a phase array of antenna elements which may be variably electrically steered to obtain the strongest signal; plural antennas at which the receiving unit may compare the instantaneous phase of the arriving signal at each of the plural antennas to determine the direction of a signal which would provide the received phase relationship among signals; or other convention methods. No matter which angle of arrival method is used, such methods generally are less accurate as a target unit moves close to a line between the receiving stations. For example, if a particular system has an uncertainty of X degrees in the angle of arrival, the uncertainty in the geolocation of the target unit is related to the intersection of the arcs of uncertainty 31 of X degrees from each receiving station. As the target unit moves toward a location which approaches a line between the receiving stations, the intersection of the arcs of uncertainty 31 grow larger until for the extreme case of a target unit on the line between the receiving stations, the system cannot ascertain where the target is located along the line between the receiving units. For example, with respect to the system of FIG. 3, a zone of uncertainty 30, associated with an approximately 90 degree intersection of the arcs of uncertainty from two stations RS1 and RS2 is considerably smaller than the zone of uncertainty 32 associated with a much shallower intersection.

To obviate the problems associated with AOA systems, such systems generally use at least three receiving stations, each mutually remote from the other. In such systems, the central processing unit 12 obtains AOA information from at least three receiving stations and can always determine a location by use of intersecting arcs which are not at or near lines connecting the receiving stations.

Figure 4:
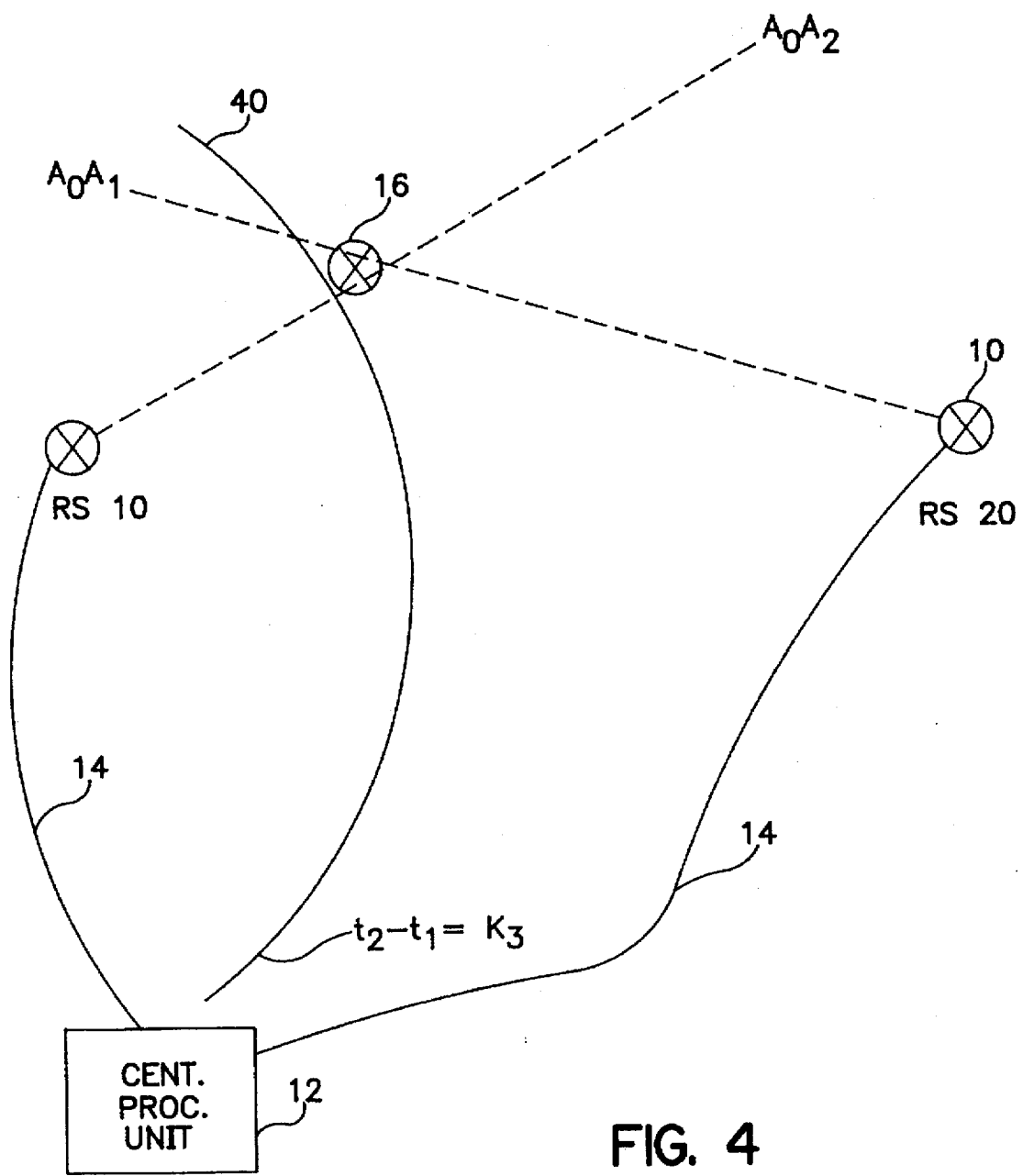
FIG. 4 is a pictorial diagram depicting a system of the present invention.

With reference to FIG. 4, a system of the present invention requires only two receiving stations RS 10 and RS 20 to determine the geolocation of a target unit 16. In systems of the present invention, each receiving location 10 receives a signal from the target unit 16 and determines both the angle-of-arrival and the time of arrival of the signal, which is provide, in turn, to the central processing unit 12 through conventional communications links 14. At the central processing unit 12, the time of arrival information between two stations may be used to compute a locus of points along a curve 40 at which the target unit 16 may exist (i.e., the locus of points from which a signal would have the determined time difference of arrival between the given two receiving stations 10). The precise point along the curve 40 at which the target unit 16 is determined to be located is obtained from the intersection of the curve 40 with the bearing lines (from the angles of arrival) AOA1, AOA2 from either one of the receiving stations, RS10 or RS20.

In a system in which multiple receiving antennas are needed to provide geolocating (and/or communications) coverage throughout a geographic area, such as in a low power personal communication system which covers a wide geographic area, only two receiving stations are needed to be able to be in contact with a target unit at any time in order to provide complete geolocating coverage. If in a given system, the signals from a target unit are received at more than two receiving stations, the processing unit can combine the bearing lines and the curves using any vectorial combination scheme. Depending upon the local terrain conditions and other factors, the central processing unit 12 may: weight the signals from some receiving sites more heavily than others; weight the signals in proportion to a metric of signal quality such as signal-to-noise ratio of the received signals; weight more heavily the positions determined from receiving stations closer to the determined location of the target unit; eliminating some of the bearing lines and/or curves for outlying estimates; weighting more heavily the curves determined from the TDOA determinations. Indeed, the central processing unit may determine the geolocation of the target unit using a moment of inertia calculation based on the weighted estimates of position.

As will be perceived by those skilled in the art, the use of the present invention reduces the need for receiving stations to be within receiving range of target units. In a cellular like system in which receiving stations exist throughout a coverage area, no more than two of such receiving stations are required to be able to receive signals from the target units in the system of the present invention.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A system for locating a transmitting unit relative to plural fixed receiving locations, comprising:

(A) a mobile unit transmitting an RF signal;

(B) plural fixed units, each of said fixed units receiving said transmitted signal and each fixed unit comprising:

(i) means for determining the angle of arrival of said transmitted signal;

(ii) means for determining the time-of-arrival of said transmitted signal;

(C) determination means for determining the location of the mobile unit based on the angle of arrival and the time of arrival of the transmitted signal at each of the fixed units.

2. A locating system for the source of an RF signal comprising:

(A) a clock;

(B) plural receivers, each receiver receiving said RF signal, and each receiver comprising:

(i) angle-of-arrival detector for computing the angle of arrival of said RF signal;

(ii) time-of-arrival detector for determining the time of arrival at said receiver of an identifiable portion of said RF signal, said time of arrival being determined with respect to said clock;

(iii) reporting means for reporting the detected angle-of-arrival and the detected time-of-arrival; and, (C) a location determining site for receiving the detected angle-of-arrival and the detected time-of-arrival from each of said plural receivers and for determining therefrom the location of said source of said RF signal.

3. The system of claim 2 wherein said location determining site determines said location by computing the set of locations corresponding to the time-difference-of-arrival of said RF signal at said plural receivers and intersecting said set of locations with one of said angles-of-arrival to determine the location of the source of the RF signal.

4. The system of claim 2 wherein said plurality is 2.

5. The system of claim 2 wherein said plurality is 2 and only one of said angles-of-arrival is used to determined the location of said source.

6. A method for determining the location of a source of an RF signal, comprising the steps of:

(A) determining the angle of arrival and the time of arrival of an identifiable portion of said RF signal at a first receiver location;

(B) determining the time of arrival of said identifiable portion of said RF signal at a second receiver location, said time of arrival determination being coordinated in time with the time of arrival determination of the first receiver location;

(C) determining the locus of points along the surface of the earth from which the time of arrivals at the two receiver locations satisfies the ratio of the two determined times of arrival;

(D) determining along said locus of points the point at which the angle of arrival from said first receiver location matches the determined angle of arrival, said point being associated with the source of the RF signal.

7. The method of claim 6 further comprising the steps of:

(E) repeating steps (C) and (D) for each set of receiver locations within receiving range of said RF source; and, (F) determining the location of said RF source by combining the points.

8. The method of claim 7 wherein the points are combined by selectively weighing one or more of the points more heavily than others of the points.

9. The method of claim 8 wherein said step of determining the location is accomplished by computing a moment of inertia of the points.

10. The method of claim 6 wherein only two receivers are used to determine the point.

11. A system for locating a transmitting unit comprising:

(a) a transmitting unit which transmits a signal;

(b) plural means for receiving a signal transmitted by said transmitting unit, said means for receiving being geographically diverse from one another to provide locating coverage over a desired geographic territory; and, (c) means for decoding the signals received by said plural means for receiving, said means for decoding comprising:

(i) means for determining the angle at which the signal from the transmitting unit arrives at each of said plural means for receiving;

(ii) means for determining the time of arrival of the signal from the transmitting unit at each of said plural means for receiving;

whereby said means for decoding determines the geolocation of said transmitting unit based on the angle of arrival of the signal at one of said means for receiving and the times of arrival of the signal at plural of the means for receiving.

12. The system of claim 11 wherein said means for decoding determines said geolocation by computing the set of locations corresponding to the time-difference-of-arrival of said signal at said plural means of receiving and intersecting said set of locations with one of said angles-of-arrival to determine the location of the source of the signal.

13. The system of claim 12 wherein said plurality of said means for receiving is 2.

14. The system of claim 12 wherein said means for determining determines said geolocation with respect to the angle of arrival at plural of said means for receiving.

* * * * *